C. E. STROUD.
HARROW.
APPLICATION FILED JUNE 26, 1915.
1,190,683.
Patented July 11, 1916.
2 SHEETS—SHEET 1.
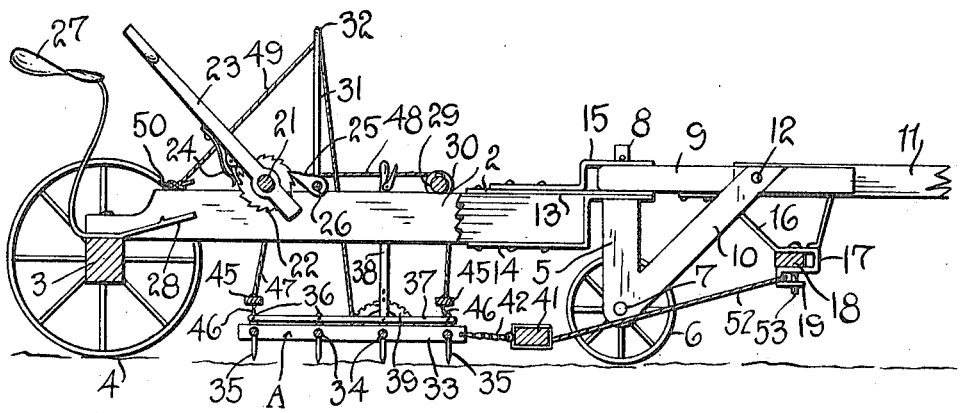
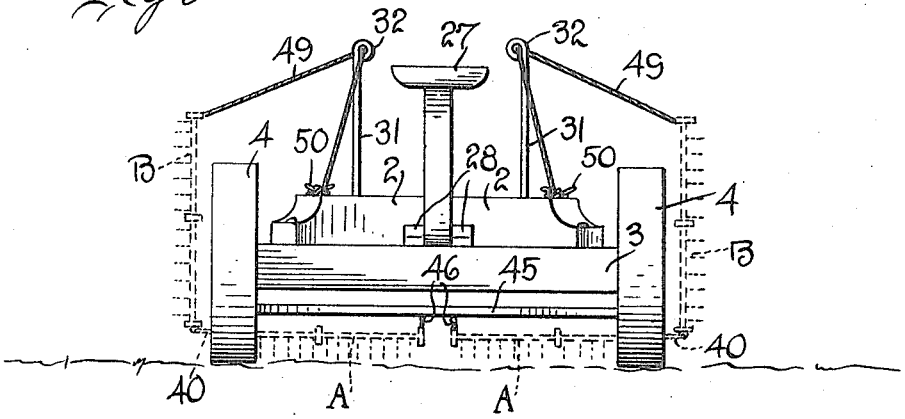
Inventor
C. E. Stroud
By Watson E. Coleman
Attorney

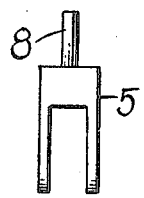

UNITED STATES PATENT OFFICE.

CLARENCE E. STROUD, OF BLADEN, NEBRASKA.

HARROW.

1,190,683.  Specification of Letters Patent.  Patented July 11, 1916.

Application filed June 26, 1915. Serial No. 36,508.

*To all whom it may concern:*

Be it known that I, CLARENCE E. STROUD, a citizen of the United States, residing at Bladen, in the county of Webster and State of Nebraska, have invented certain new and useful Improvements in Harrows, of which the following is a specification, reference being had to the accompanying drawings.

My invention relates to agricultural machines, and particularly to the class of harrows.

The primary object of my invention is the provision of a very simple and effective machine for harrowing the soil, in which a plurality of harrow sections are flexibly connected to each other and in which one or more of the harrow sections may be disposed in operative positions while the other harrow sections are in inoperative position.

A further object of the invention is to provide a machine of this kind in which the harrow sections are suspended from a wheeled supporting frame, and to provide means whereby the harrow sections may be raised or lowered to suit the exigencies of service.

A further object of the invention is to provide a harrow of the character before described having end harrow sections which may be raised or lowered, permitting, in the former case, the harrow to pass through the ordinary farm gate.

A further object of the invention is to provide a supporting means which may be connected to any ordinary harrow section for the purpose of suspending the harrow sections and raising or lowering them with relation to the ground.

Other objects will appear in the course of the following description.

My invention is illustrated in the accompanying drawings, wherein:

Figure 1 is a side elevation of my improved harrow partly broken away; Fig. 2 is a plan view thereof; Fig. 3 is a rear view thereof showing the end harrow sections raised; Fig. 4 is a detailed view of the standard supporting the front wheel.

It will be seen by reference to these figures that I provide a main supporting frame having supporting wheels connected to a tongue, and that the harrow sections are suspended from this main supporting-frame. The supporting frame comprises the convergent beams 2, which, at their rear ends, are rigidly mounted upon a transverse axle 3, carrying the rear traction wheels 4. These traction wheels may be of any suitable character, but preferably are spoked wheels with relatively wide flat tires so formed as not to pick up earth. The forward end of the supporting frame formed by the members 2 is mounted upon a pivoted truck which comprises the standard 5 which is bifurcated at its lower end to receive the forward traction wheel 6 mounted upon a transversely extending axle 7. The upper end of the standard 5 is reduced in diameter to form an upwardly extending pivot pin 8 which passes through a clevis carried upon the forward end of the frame 2. Attached to the pivot pin 8 and rotating therewith is the forwardly extending beam 9 which is connected to the lower end of the standard 5 by braces 10 extending downward and through which the axle 7 passes. The forward end of this member 9 is bifurcated for the reception of the tongue 11 which is pivoted in said bifurcated end by means of the pivot bolt 12.

The forward ends of the beams 2 are connected to each other by means of upper and lower plates 13 and 14, the plate 14 being bent to extend upward on the forward ends of the beams 2 and then outward, while the plate 13 extends outward beyond the ends of the beams. The upper shoulder of the standard 5 rests against these conjoined plates 13 and 14, and the pin 8 is engaged by means of a tongue 15 which is attached to the plate 13 but is angularly bent and spaced therefrom to embrace the rear end of the member 9. To the under face of the member 9 is attached the downwardly and forwardly extending arm 16 which is rebent at its forward end as at 17, to form the clevis within which is pivoted the evener bar 18. This clevis is then rebent to form a hook 19. Connected in the usual manner to the evener bar are the swingle trees 20.

Rotatably mounted in bearings upon the beams 2 and extending thereacross is the shaft 21 which at its middle is provided with the ratchet wheel 22. Rotatably mounted upon this shaft is the lever 23 which is bifurcated to pass on each side of the ratchet wheel 22, this lever carrying upon it the pawl 24 which engages the ratchet teeth on the wheel 22. A pawl 25 is rotatably mounted upon a transverse shaft or rod 36, and it also engages the teeth of the ratchet wheel to prevent reverse motion of the ratchet and shaft when the pawl is in operative engagement. It will thus be seen that an oscillating motion communicated to the lever 23 will cause an intermittent rotary motion of the shaft 21. This lever 23 is preferably disposed in convenient relation to a seat 27 mounted upon the rear axle 4, this seat having foot rests 28 on each side thereof.

Fixedly mounted adjacent the forward end of the frame formed by the beams 2 is the fixed shaft 29 carrying pulleys 30 at the ends thereof. Extending upward from the beams 2 intermediate the shafts 29 and 21 are the cable supporting vertical rods 31 having eyes 32 at their upper ends whose purpose will be later described.

This harrowing machine is designed to support a harrow formed in four flexibly connected sections, as shown in Fig. 3. The two middle sections are each designated A, while the two end sections are designated B. All of these sections are constructed in the same manner, of a plurality of longitudinally extending members 33 and transversely extending shafts 34. These shafts are rotatably mounted in the members 33 and carry the harrow teeth 35. All of the shafts have upwardly extending arms 36 connected by a link 37 in turn operated by means of a lever 38 operative over a sector 39 mounted upon one of the members 33, the lever being provided with a pawl or latch engaging the sector to hold the lever set in any adjusted position. By shifting the lever in the usual manner the harrow teeth may be reversed. Each of the sections A is connected to the adjacent section B by means of flexible shackles 40 of any suitable construction.

Disposed in advance of the two sections A is a draft bar 41 to which the end members of each of the sections A are connected by means of flexible shackles 42, these shackles being so formed as to permit the detachment of the harrow sections therefrom. Pivotally connected to the ends of the draft bar 41, as by means of the coupling members 43, are the draft bars 44 which are disposed opposite each end section B. These draft bars 44 are also connected to the end members 33 of the harrow sections B by means of the links or shackles 42, as previously described.

Disposed above the middle harrow sections A are the transversely extending rods or bars 45 from which these harrow sections are suspended by means of the suspending links 46. Fast upon the ends of the shaft 21 are the cables 47, which cables are wound upon the shaft 21 and are attached to the ends of the rear bar 45. Also wound upon the shaft 21 are the cables 48 which pass over pulleys 30 and are attached to the intermediate portions of the forward bars 45. Thus it will be seen that a rotation of the shaft 21 in one direction will cause the winding up of both of the cables 47 and 48 and the even lifting of the harrow sections. For the purpose of raising the end harrow sections B into a vertical position and at right angles to the harrow sections A, I provide the cables 49 which pass upward and through the eyes 32 on the rods 31 and then pass down to the plates 50 attached to the beams 2 in a convenient position to the operator.

Extending from the ends of the draft bar 41 is a chain, cable, or other flexible connection, 51, which is operatively engaged with the hook 19, and extending from each of the draft bars 44 is a chain, cable, or other flexible connection 52 which is formed with a loop which also extends over the hook 19. These flexible connections are held in engagement with the hook 19 by means of the pin 53 which passes through the clevis 17 and engages the evener bar 18.

The operation of my invention will be obvious from what has gone before. It will be seen that I may use either one, two, three, or four harrow sections, as desired, and that under normal circumstances the end harrow sections B will be raised to a vertical position, thus greatly reducing the width of the machine and all of the harrow sections may be raised from engagement with the ground or lowered into engagement therewith. It will also be seen that the draft upon the harrow sections is not through the machine but through the draft bars and that these are flexibly connected to the forward truck and that they are flexibly supported from the main frame so that they will have that flexibility which is requisite in harrows in order to allow them to conform to the contour of the ground and pass over stones, boulders, or other obstructions. It will further be seen that my mechanism is adapted to support harrow sections of any desired form and character, and that no weight comes upon the draft animals, the weight being all supported by the wheels. When the end sections are folded up, the machine is so reduced in width that it may readily pass through an ordinary farm gate.

While I have illustrated certain details of construction which I deem preferable for the purpose intended, I do not wish to be limited thereto as it is obvious that many changes might be made without departing from the spirit of the invention.

Having described my invention, what I claim is:

1. In a harrow, a wheeled supporting frame, a pair of flexibly supported harrow sections, a manually rotatable main shaft mounted upon the frame, a subsidiary shaft having pulleys, flexible connections attached to said harrow sections, certain of the connections being wound directly upon the main shaft and certain other connections passing over the pulleys on the subsidiary shaft and being connected to the main shaft whereby the sections may be raised or lowered, lateral harrow sections flexibly connected to the first named harrow sections and adapted to be raised from a horizontal to a vertical position, rods extending upward from the frame and having eyes at their upper ends, flexible connections passing from the ends of the lateral harrow sections through the eyes, and means on the frame for holding the ends of the flexible connections.

2. In a harrow, a wheeled supporting frame, flexibly supported harrow sections, a main shaft mounted upon the frame, means for rotating said main shaft, a subsidiary shaft having pulleys, flexible connections attached to said harrow sections, certain of the connections being wound directly upon the main shaft and certain other connections passing over the pulleys on the subsidiary shaft and being connected to the main shaft whereby the harrow sections may be raised or lowered.

In testimony whereof I hereunto affix my signature in the presence of two witnesses.

CLARENCE E. STROUD.

Witnesses:
D. P. KIMMEL,
C. W. DICKENSON.

Copies of this patent may be obtained for five cents each, by addressing the "Commissioner of Patents, Washington, D. C."